XR 2,881,976 OSS REFERENCE SEARCH ROOM
TX 3092R
X2532

April 14, 1959 E. C. GREANIAS 2,881,976

CODE TRANSLATING DEVICE

Filed Dec. 30, 1955 2 Sheets-Sheet 1

INVENTOR.
EVON C. GREANIAS

2881976
OR IN 235/61R

April 14, 1959

E. C. GREANIAS 2,881,976

CODE TRANSLATING DEVICE

Filed Dec. 30, 1955

2 Sheets-Sheet 2

INVENTOR.
EVON C. GREANIAS

United States Patent Office 2,881,976

Patented Apr. 14, 1959

2,881,976

CODE TRANSLATING DEVICE

Evon C. Greanias, Vestal, N.Y., assignor to International Business Machines Corporation, New York, N.Y., a corporation of New York Application December 30, 1955, Serial No. 556,684

3 Claims. (Cl. 235—61)

This invention relates to a code translating device, and particularly to such a device which employs physical channeling means to accomplish code conversion.

Code translators of the mechanical, electro-mechanical or electronic types are old in the art. None of these types of translators are simple in construction and economical for certain purposes. The mechanical and electro-mechanical translators present the additional problem generally associated with devices having moving parts.

Also, various types of translating devices, using optical means, have been employed in the past. However, these optical translators have been associated with record cards or similar light-passing material, the object of which was to present an adjustable shutter with respect to the light source. In this way the position of the light-passing material determines the path which the light takes in reaching output points for the purpose of operating output devices, for example photoelectric cells. Nor are light-channeling devices, for example, Lucite and quartz rods, new in the art. Such rods or tubes permit light beams that are developed at their input ends to be directed to output ends.

None of the above-mentioned prior art devices relates to physical channeling means that is interconnected for the purpose of codally representing at the output ends of the channeling means the condition present at the input ends. Therefore, the principal object of this invention is to provide a simple and economical code translator of the channeling type.

Another object is to provide a code translator without the existence of back circuits for developing erroneous operations.

In record card controlled business machines it is often necessary to convert data quickly into a usable form, whether to perform an immediate control function or for distribution to other computer or logical devices. According to this invention, energy channeling tubes are interconnected in a matrix fashion for developing an output condition which is the coded equivalent of the input represented by a perforated record material used with business machines. In the disclosed embodiments of this invention, interconnected tubes channel light beams to predetermined output ends to develop coded values.

A "no-light" condition, as well as a "light" condition, may be used for indicating a coded output value that is representative of the input value. In general a tube matrix arrangement employing the "light" condition is used whenever it is desired to convert a decimal value to a value in some other code, such as binary, which may have more than one output indication for each input indication. For example, the binary-to-decimal conversion of "7" would require only one input indication (7) and three output indications (1, 2, 4). On the other hand, the "no-light" condition is used when it is desired to convert a binary or similar code value into some other code, which has only one output indication for a plurality of input indications. Thus a binary-to-decimal conversion of "7" is accomplished by converting three (1, 2, 4) input "no-light" conditions to one (7) output "no-light" condition. The "light" or "no-light" output conditions may be distributed through other tubes to participate in computational or logical functions.

The functions of such tube matrices can be extended, for example, by converting the "no-light" condition at a selected output into a "light" condition. One way this may be accomplished is by using a bi-directional tube matrix arrangement to channel long wave red light beams to a thin layer of green photo-quenchable phosphor, located at each bi-directional merging point. All the thin phosphor layers are also illuminated with weak ultraviolet light, either directly by an external source or through the light tubes, if ultraviolet transmission in the tubes is adequate. The intensities of the red and ultraviolet lights are adjusted so that the red light from a single tube will completely erase the effect of the ultraviolet light on the phosphor when the red light and the ultraviolet lights occur simultaneously. The phosphor layer which does not receive any quenching red light glows with its characteristic green color to illuminate corresponding tube output ends. This green light may be distributed to several points by other light tubes to furnish desired indications or inputs for other computational or logical devices.

Other objects of the invention will be pointed out in the following description and claims and illustrated in the accompanying drawings, which disclose, by way of example, the principle of the invention and the best mode, which has been contemplated of applying that principle.

Figure 1:
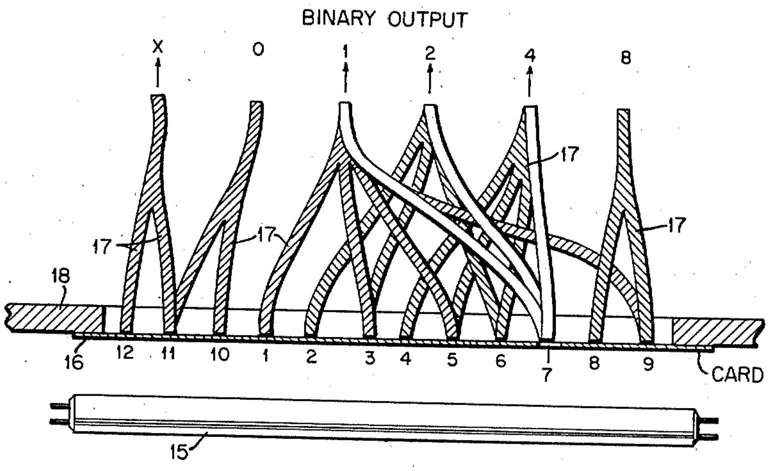
Fig. 1 illustrates a decimal-to-binary optical code translator.

In the embodiment of the invention illustrated in Fig. 1, the code translator takes the form of a plurality of light tubes or guides, each of which is connected in a manner to represent the 12 different recording positions of a record card. This is to say, one tube is arranged in a position corresponding to recording position 9 of the record card, another tube is placed in position 8, and so on through the recording positions, including the control positions 11 and 12. All of the tubes 17 are shown attached to part of a record card controlled machine represented by 18.

The tubes 17 are branched, as necessary, to permit the decimal value recorded on the record card 16 to be represented as the binary equivalent at the output end or ends of the tubes. For example, the light tube associated with position 9 of the record card is branched to binary positions 1 and 8; the tube in position 8 goes directly to binary position 8; the tube at card recording position 7 is branched to binary positions 1, 2 and 4, with all the other tubes being similarly branched to provide translation in binary form.

Fig. 1 illustrates an arrangement wherein the record card 16 has a perforation in its recording position 7. This permits the light beams developed by light source 15 to pass only through this perforation to channeling tubes 17 that branch to output positions 1, 2 and 4. The light beams which appear at the tube output ends corresponding to the binary digits 1, 2 and 4 may be used to energize photoelectric cells (not shown) or may be passed on to other computer or logical devices.

Figure 2:
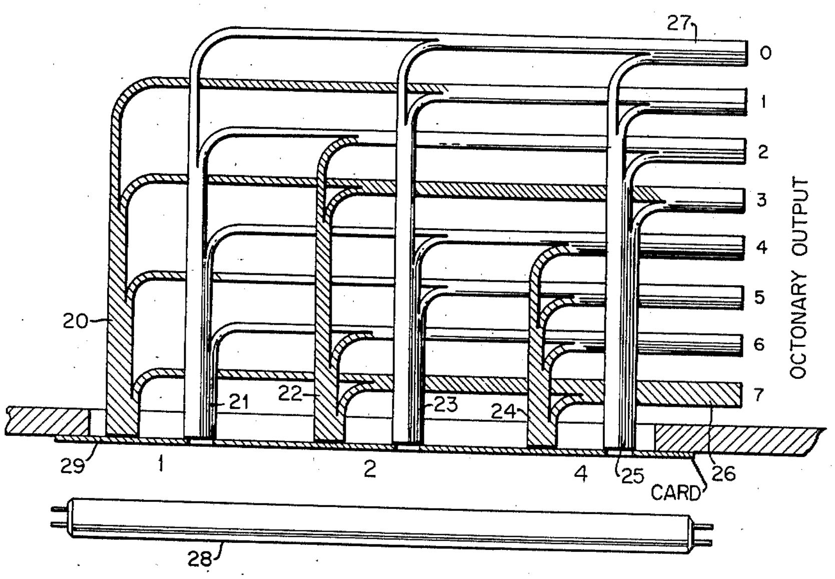
Fig. 2 illustrates a binary-to-octonary optical code translator.

Fig. 2 discloses a channeling matrix arrangement in which a "no-light" condition at an output end represents the input value. As shown, the input ends of the tubes are in pairs, one pair for each binary order 1, 2 and 4. Tubes 20 and 21 are associated with the binary 1 value, tubes 22 and 23 are associated with the binary 2 value; and tubes 24 and 25 are associated with the binary 4 value. Each one of the tubes is branched to merge with one of the tubes associated with each of the other binary values. For example, tube 21 is merged with tubes 23 and 25 to form tube 27, which represents position zero. The other tubes are similarly branched to assume predetermined positions of the octonary code.

In operation, one of the input tubes of each pair of tubes of a binary value channels light and the other tube remains dark. With regard to binary 1, the presence of light at the input end of tube 21 and the simultaneous absence of light at the input end of tube 20 indicates that a binary 1 has been recorded on the record material. A reverse light condition at the input of these two tubes would indicate the absence of a binary 1 value on the record material. Similarly, the presence of light at the input of the right tube of each pair of tubes associated with the binary 2 and 4 values indicates the presence of such values on the perforated record material, and the presence of light at the input of the left tube of these pairs of tubes indicates an absence of such values on the record material.

More specifically, with regard to Fig. 2, there is shown a light source 28 passing light beams through a perforated record material 29 to selected input ends of a tube matrix arrangement. Light beams are received by tubes 21, 23 and 25 and not by tubes 20, 22 and 24. Tubes 20, 22 and 24 merge to form tube 26, which represents position 7 of the octonary output. Only this output end will be in a "no-light" condition, since tubes 21, 23 and 25 are branched to form ends corresponding to positions 0–6. In the same way the octonary output may be determined for any other binary input, the "no-light" condition developed at one of the output ends representing the binary value on the record material.

Figure 3:
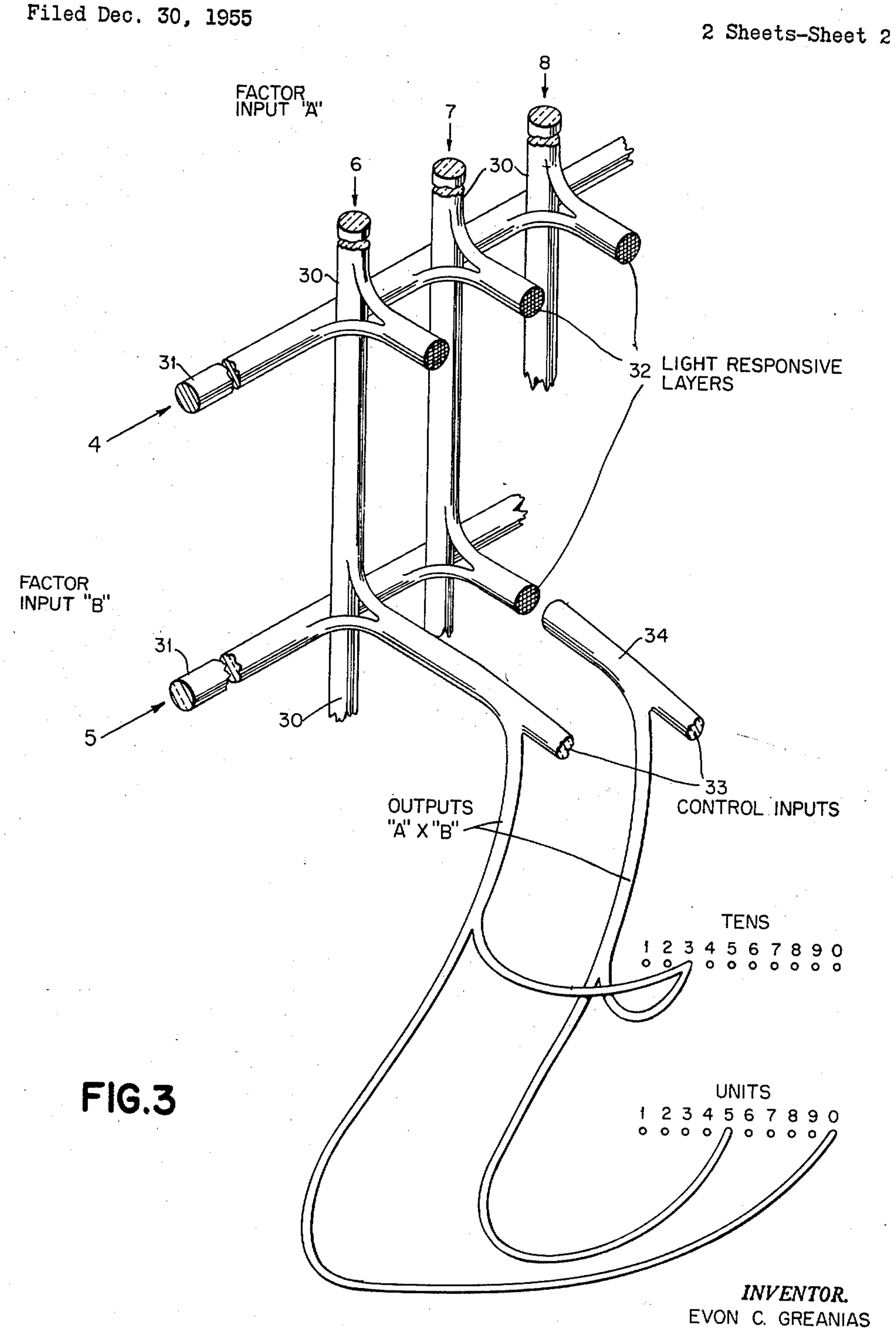
Fig. 3 illustrates a tube matrix arrangement for a multiplication or table look-up arrangement.

Fig. 3 illustrates another decording arrangement employing light tubes in which the light tubes are bi-directionally arranged to form a multiplication matrix or table look-up system.

In Fig. 3 are shown two groups of light tubes, each of which represents a factor input. Input A is represented by tubes 30, and input B is represented by tubes 31. Each tube 30 is branched to merge with each tube 31, with a light-responsive layer 32 being found at the merging point. Beyond this layer, in each case, the merged tube 34 is branched, as required, to form output ends representing the condition $A \times B$.

Such a matrix arrangement is capable of operating by converting a "no-light" condition into a "light" condition in the following manner. The light-responsive layers at each of the tube merging points may be composed of green phosphor which can be quenched by a relatively intense long wave red light coming either through a tube 30 or 31. All of the photo-responsive layers are illuminated with weak ultra-violet light either directly by an external source, as represented by control inputs 33 in Fig. 3, or through the tubes themselves when their ultraviolet transmission is sufficient. The intensity of the red and ultraviolet lights are adjusted so that the red light from a single light tube will completely erase the effect of the ultraviolet light on the phosphor when the red light and the ultraviolet light occur simultaneously. The absence of any red light at a merging point in the tube matrix will permit its associated phosphor layer to glow with its characteristic green color. This green light is then channeled through the corresponding tube 34 to appropriate output ends which represent the factor inputs. The green light at these output ends may also be distributed to other computer and logical devices. Green filters may be used in this light distribution arrangement for the purpose of insuring that none of the ultraviolet or red light gives false output indications.

Assuming an example where a factor input of 5 is entered into tubes 31 and a factor input of 7 is entered into tubes 30, long wave red light is entered into all light tubes 30 and 31 except those representing 7 and 5, respectively. The absence of red light in these two tubes allows only their merging point, and no other, to be in a "no-light" condition. Therefore, their phosphor layer 32 receives only the ultraviolet light from control input 33. The green light developed by this single phosphor layer 32 is passed through tube 34 to output ends, corresponding to the decimal value 35. That is to say, one branch of tube 34 goes to position 3 in the tens order of a series of branched ends and another branch of tube 34 goes to position 5 of the units order of a series of branched tube ends. Only position 3 in the tens group and position 5 in the units group will display green light at this time because the other phosphor layers in the matrix hookup will have been exposed to red light. Other factor inputs will similarly develop green light conditions at corresponding tens and units positions representative of the factor inputs.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an optical code translating system, first and second sources of light beams, bi-directional channeling means comprising light tubes having input and output ends, each of the tubes in one direction being connected to each of the tubes in another direction to form a matrix network, light-responsive means at the merging points of every set of two tubes, said first light source providing light beams for selected input ends of said bi-directional channeling means and said second light source providing different light beams to all said light-responsive means to develop "light" and "no-light" conditions at the output ends of said channeling means for indicating the code represented by the selected input ends.

2. The invention according to claim 1, wherein said first light source develops long wave red light beams, said second light source develops ultraviolet light beams, and said light-responsive means is a quenchable green phosphor, with said light-responsive means at any merging point providing a green output light whenever red light beams are not channeled to said light-responsive means.

3. The invention according to claim 2, wherein the bi-directional tubes represent input factors and each tube beyond the merged point is branched to form two output ends to represent the product of the input factors.

References Cited in the file of this patent

UNITED STATES PATENTS

| | | |
|---|---|---|
| 2,268,498 | Bryce | Dec. 30, 1941 |
| 2,473,444 | Rajchman | June 14, 1949 |
| 2,550,079 | Mixer | Apr. 24, 1951 |
| 2,573,405 | Clark | Oct. 30, 1951 |